United States Patent [19]

Aspinall

[11] Patent Number: 4,557,441
[45] Date of Patent: Dec. 10, 1985

[54] BAND TENSIONING DEVICE

[75] Inventor: Eric L. Aspinall, Federal Way, Wash.

[73] Assignee: The Boeing Company, Seattle, Wash.

[21] Appl. No.: 566,028

[22] Filed: Dec. 27, 1983

[51] Int. Cl.$^4$ .................... B64D 29/06; F16L 33/00
[52] U.S. Cl. ........................... 244/129.4; 244/53 R; 24/20 TT; 411/190
[58] Field of Search ............ 244/129.1, 129.4, 110 B; 24/17 A, 19, 17 AP, 20 R, 20 TT, 22, 279, 129 D, 580; 242/142 R, 149; 285/407, 410; 411/190-192, 197-200, 204-211

[56] References Cited

U.S. PATENT DOCUMENTS

| | | | |
|---|---|---|---|
| 2,695,437 | 11/1954 | Bernard | 285/410 |
| 2,735,448 | 2/1956 | Phelps, Jr. | 138/65 |
| 2,938,690 | 5/1960 | Castle | 248/27 |
| 2,949,734 | 8/1960 | Bertin et al. | 285/410 |
| 3,070,388 | 12/1962 | Werth | 285/411 |
| 3,122,098 | 2/1964 | Glennan | 24/279 |
| 3,349,456 | 10/1967 | McKibben | 24/279 |
| 3,396,439 | 8/1968 | Schaub | 24/274 R |
| 3,601,868 | 8/1971 | Elsner | 24/279 |
| 3,851,690 | 12/1974 | Wing et al. | 411/190 |
| 4,099,304 | 7/1978 | Luc | 24/274 R |
| 4,221,030 | 9/1980 | Bernede | 24/274 R |
| 4,242,744 | 12/1980 | Rottman | 24/20 TT |
| 4,468,842 | 9/1984 | Perry et al. | 24/20 LS |

FOREIGN PATENT DOCUMENTS 220243 8/1924 United Kingdom ............... 411/200

Primary Examiner—Trygve M. Blix
Assistant Examiner—Rodney Corl
Attorney, Agent, or Firm—Christensen, O'Connor, Johnson & Kindness

[57] ABSTRACT

A tensioning assembly for applying tension to a band-type clamp includes a T-bolt having a shank portion and a T-head portion. The T-bolt is adjustably mounted to a first end of the band clamp and a keeper constructed and arranged to receive the T-head portion of the T-bolt is affixed to a second end of the band clamp. A nut threadably engages the shank portion of the T-bolt and rotation of the nut on the T-bolt draws the head to the T-bolt towards the first end of the band clamp thereby drawing with it the second end of the band clamp. An anti-rotation device is associated with the nut operably engageable with the nut to prevent its rotation. The anti-rotation device cooperates with a force-applying tool, such as a wrench, so that when the tool is placed on the nut, the anti-rotation device disengages from the nut. Preferably the tensioning assembly also includes an indicator remote from the T-bolt and operably associated with it to indicate the achievement by the T-bolt of a predetermined tension.

15 Claims, 4 Drawing Figures

BAND TENSIONING DEVICE

BACKGROUND OF THE INVENTION

This invention relates to band-tensioning devices and in particular relates to band-tensioning devices that are compact to fit within a confined space and further that provide a capability of remote actuation of an indicator means to indicate the degree of tension provided by the tensioning device.

Many devices are available to latch and tension band clamps. Most of the current devices are lever action over-center latches requiring a substantial amount of room to operate, particularly when the tension to be applied by the device is in the range of 2000 to 3000 pounds. In certain applications, for example, in the V-band that holds the thrust reverser assembly to the body of a jet aircraft engine, a significant tension is required but only a small space is available in which the tensioning device can be operated.

In certain situations, the band tension can be critical to the proper operation of a device and it is desirable in such instances for an indication of the band tension applied by the tensioning device to be transmitted to a location remote from the band-tensioning device. Again, in the example of a thrust reverser V-band, the V-band must be properly tensioned during operation of the aircraft. Serious mechanical failures or even personal injury could result from a separation of the thrust reverser from the remainder of the engine. During maintenance of the engine, the V-band may be loosened and retightened by different mechanics. The entire engine assembly is surrounded by a cowling that typically is formed of two halves that can be separated to uncover the engine components for maintenance work. If the cowling is closed after maintenance, without proper tension being placed on the thrust reverser V-band, it would be possible that the thrust reverser could separate from the engine during operation and cause severe damage to the aircraft. It is therefore desirable to have some indication of whether or not the proper tension has been applied to the V-band that is easily available to the operator who is closing the engine cowling so that the cowling could not be closed if the V-band was not at the proper tension.

It is, therefore, an object of the present invention to provide a low-profile band-tensioning device that can apply relatively high degrees of tension to a band clamp but that can be operated in a minimal amount of space.

It is a further object of this invention to provide such a tensioning device that includes a remote indicator actuatable to indicate the achievement of a predetermined amount of tension by the tensioning device.

It is an another object of this invention to provide such a band-tensioning device that meets the normal requirements of load capacity and ease of manufacture, installation, and maintenance.

SUMMARY OF THE INVENTION

In accordance with the above-stated objects a band-tensioning device is provided for use with a band clamp. The band clamp preferably has means at each end thereof for connection to respective male and female parts of the tensioning device. The tensioning device includes a T-bolt that has a shank portion and a T-head portion that is affixed transversely to a first end of the shank portion. Means are provided for mounting the T-bolt to a first end of the band. A nut is threadably engaged on a second end of the shank portion and is operable to draw the T-bolt T-head portion toward the first end of the band. A keeper means is affixed to a second end of the band and is constructed and arranged to cooperatively receive the T-head portion of the T-bolt so that as the T-head is drawn toward the first end of the band, the second end of the band is drawn along with it. Anti-rotation means associated with the nut is operable to engage the nut to prevent rotation of the nut about the shank. The anti-rotation means is disengageable from the nut upon the placement of a force-applicating tool, such as a wrench, on the nut. In one embodiment of the tensioning device of the present invention, the anti-rotation means includes an arm that is pivotally mounted to the T-bolt mounting means and is movable between a first position in which a first portion of the arm engages the nut and a second position in which the first portion is spaced from the nut. The arm is preferably constructed to include a cam surface that engages the force-applicating tool and operates by way of cam action between the cam surface and the force-applicating tool to move the arm into its second position as the force-applicating tool is placed on the nut.

In a preferred embodiment of the tensioning device of the present invention an indicator assembly is located remotely from the tensioning device and is operable to indicate the achievement of a predetermined tension by the tensioning device. In the aircraft environment, the T-bolt mounting means and keeper means are affixed to first and second ends, respectively, of a V-band clamp used to hold together the subassemblies of the engine. The indicator means preferably includes a stop member that is positionable between the first and second halves of a cowling surrounding the engine to prevent the closure of the cowling prior to the attainment by the tensioning device of a predetermined degree of tension. Upon attainment of such predetermined degree of tension the stop member is operable by the tensioning device to move to a position out of engagement with the cowl halves to permit the closing of the cowl halves.

BRIEF DESCRIPTION OF THE DRAWINGS

The objects and advantages of the present invention will be better understood by those of ordinary skill in the art and others upon reading the ensuing specification when taken in conjunction with the appended drawings wherein.

DETAILED DESCRIPTION OF THE PREFERRED EMBODIMENT

Figure 1:
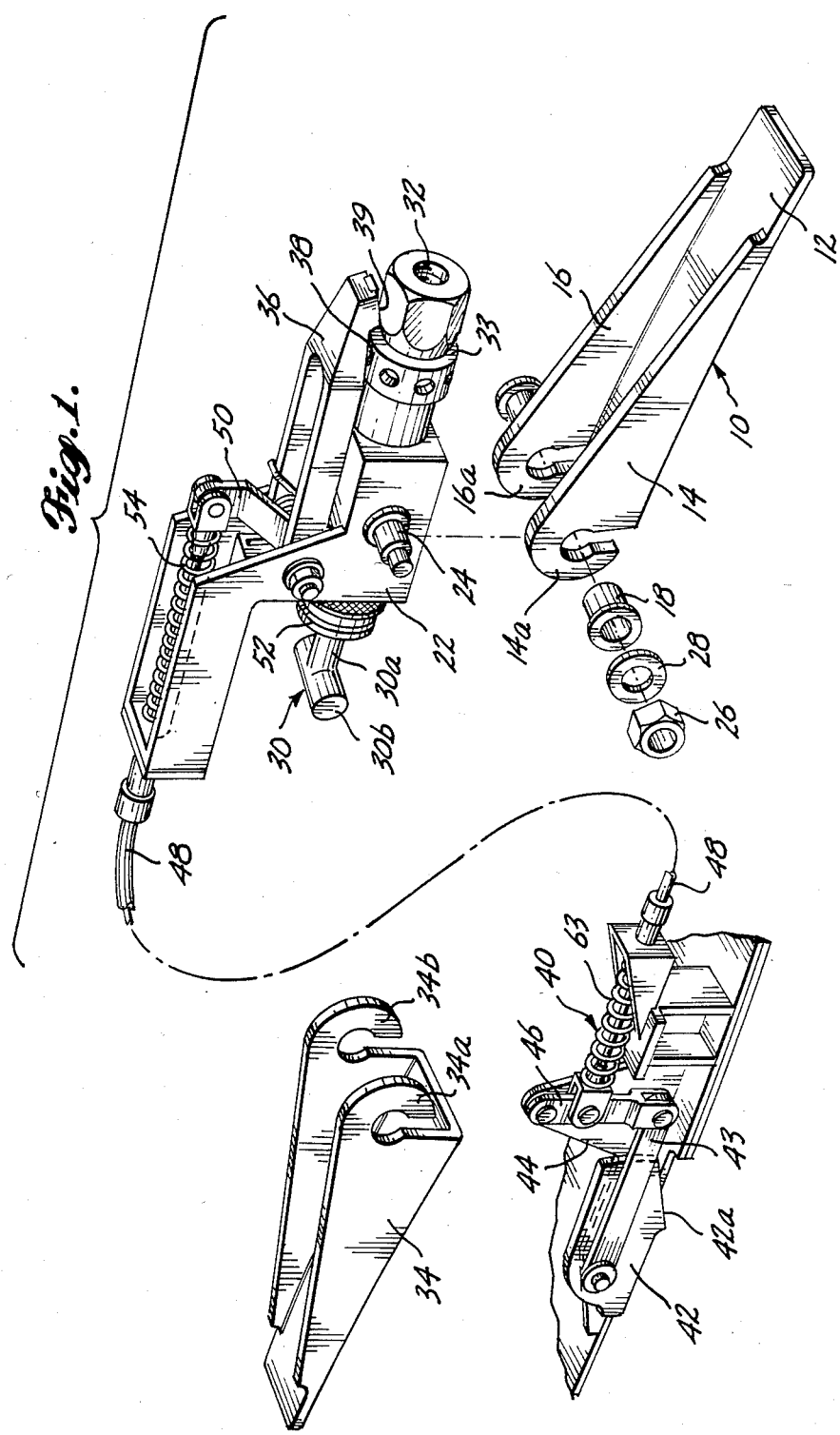
FIG. 1 is an isometric view of one embodiment of a band-tensioning device made in accordance with the principles of the present invention.
Figure 2:
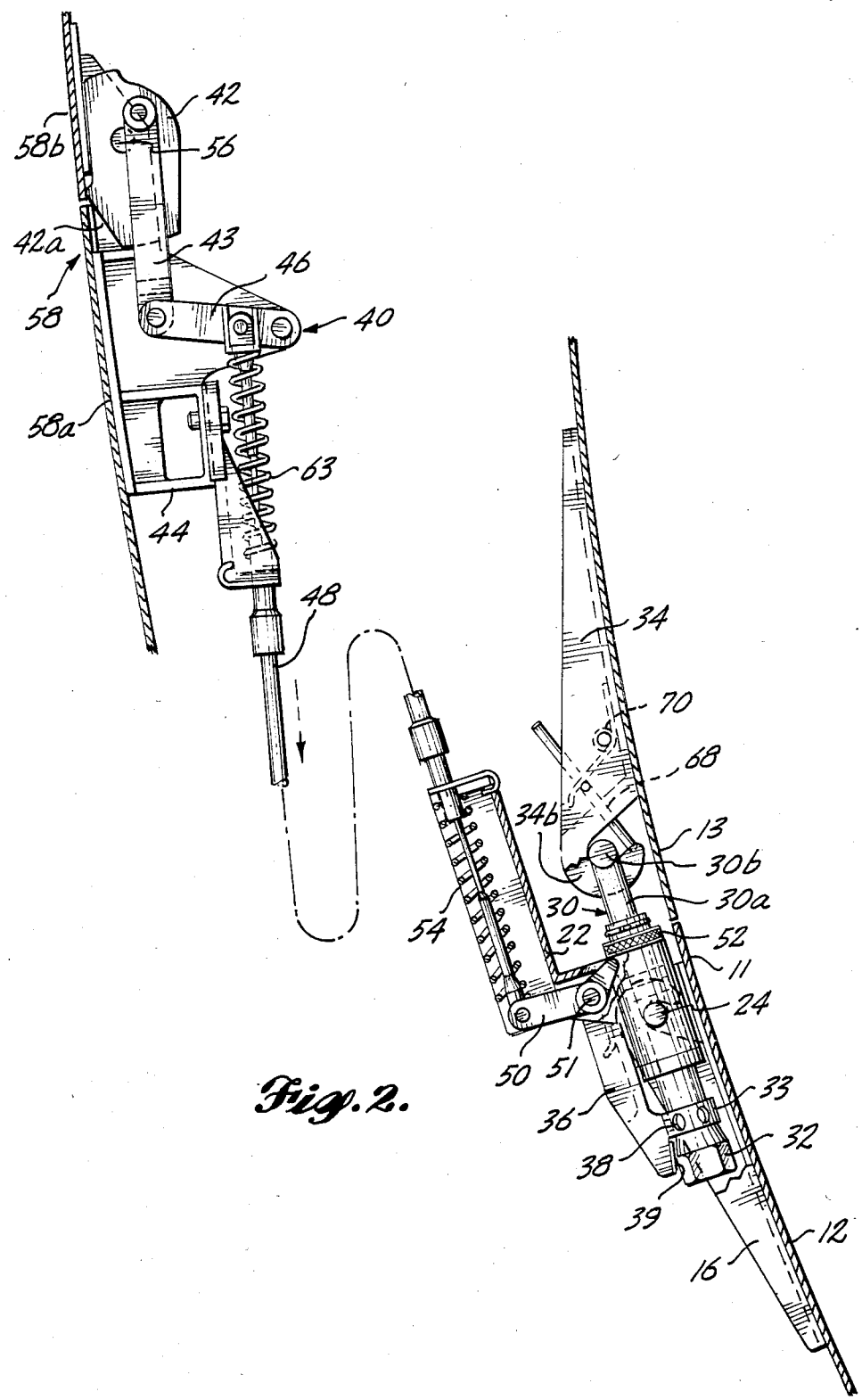
FIG. 2 is a side elevational view of the band-tensioning device of FIG. 1 in the tensioned state.
Figure 3:
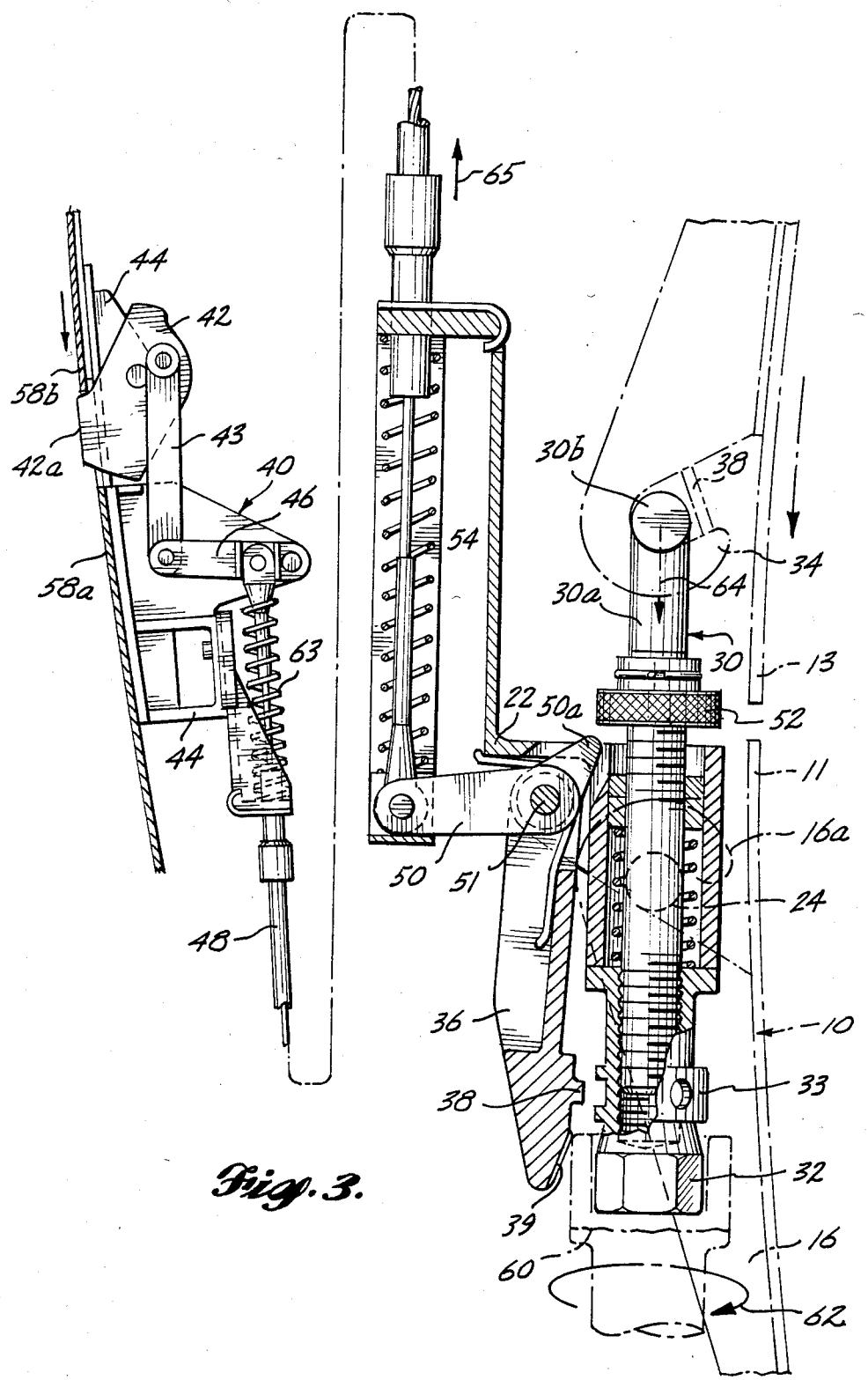
FIG. 3 is a side elevational view in somewhat expanded scale of the band-tensioning device of FIG. 2 in the loosened state.

One embodiment of a band-tensioning device made in accordance with the principles of the present invention is illustrated in FIGS. 1, 2, and 3. While the tensioning device of the present invention is useful with any band-type clamp arrangement, the preferred embodiment will be described in the aircraft engine environment in which it is used to apply a predetermined tension to a V-band surrounding the thrust reverser assembly of a typical turbofan jet engine to hold the thrust reverser to the remainder of the engine assembly. A trunnion mount fixture 10 is attached to a first end 11 of the band clamp. The trunnion mount fixture includes a web 12 and two parallel projecting flanges 14 and 16. The flanges 14 and 16 have C-shaped ears 14a and 16a integrally formed at one end thereof. The ears 14a and 16a receive bushings 18 and 20. The male portion of the tensioning device includes a frame assembly 22 having trunnion pins 24 extending from the opposing sides of the frame 22, the trunnion pins being received within the bushings 18 and 20 to trunnion mount the male portion of the tension assembly to the V-band. Preferably, the ends of the trunnion pins 24 are threaded and are threadably engaged by threaded fasteners such as hex nut 26. Preferably, a washer 28 is inserted between the hex nut and its respective bushing 18 or 20 in a conventional manner.

A T-bolt 30 having a shank portion 30a and a T-head portion 30b that is integrally formed with the shank portion 30a at a first end of the shank portion, passes through the frame 22. A second end of the shank portion 30a is threaded and is engaged by a cooperatively threaded, rotatable tension-applying means such as nut 32. Rotation of the nut 32 in a first direction, for example, clockwise, as viewed in FIG. 1, draws the T-head portion of the T-bolt 30 toward the frame 22. A female keeper member 34 substantially identical to the trunnion mount assembly 10 is affixed to a second end 13 of the V-band and cooperates with the T-bolt to receive the T-head portion 30b within C-shaped ears 34a and 34b integrally formed on the keeper member 34. In operation, therefore, rotation of the nut 32 will draw the T-head portion of the T-bolt toward the frame 22 drawing with it the female member 34, which carries along with it the second end of the V-band, thereby drawing the first and second ends of the V-band together. The tension on the band is therefore determined by the number of turns applied to the nut 32 and the distance that the T-bolt head is drawn toward the frame 22. The length of the T-bolt and the pitch of the thread are predetermined for the desired tension to be applied to the band in a given situation. In the aircraft environment the tension applied to the V-band by the tension device of the present invention is typically in the neighborhood of 2000 to 3000 pounds.

To prevent accidental loosening of the V-band, an anti-rotation means is associated with the nut 32. In the embodiment of FIG. 1, the nut 32 includes a ring portion 33 and the anti-rotation means includes an arm 36 pivotally mounted at a first end to the frame 22. The arm 36 has a pin 38 extending from it adjacent its second end. The pin 38 engages one of a plurality of holes formed in the ring portion 33 to prevent rotation of the nut 32. Preferably, the second end of the arm 36 has a cam surface 39 formed thereon that cooperates with a force-applying tool, such as a wrench, to move the arm 36 upwardly as viewed in FIG. 1, thereby removing the pin 38 from engagement with the holes in the ring portion 33 of the nut 32.

An indicator assembly 40 is located remotely from the tensioning device and is operably connected to the tensioning device to provide an indication of whether or not a predetermined amount of tension has been applied to the band clamp by the tensioning means. The remote indicator assembly 40 shown in FIG. 1 includes an indicator tab 42 pivotally mounted to a frame assembly 44. The indicator tab 42 is connected to the tensioning device through a linkage assembly comprised of a first link 43 attached to the tab at a first end thereof and attached to a crank arm 46 at a second end thereof. The crank arm 46 is pivotally attached at a first end thereof to the first link and at a second end thereof to the frame 44. A push-pull cable 48 is attached at a first end thereof to the crank arm at a point intermediate the first and second ends of the crank arm. A second end of the push-pull cable 48 is coupled to a control arm 50 pivotally mounted on the frame 22. Referring now to FIGS. 2 and 3, it can be seen that when the tensioning device is in its fully tensioned state, as shown in FIG. 2, the indicator tab 42 is in a first position withdrawn within the cowling 58 of the aircraft engine. However, when the tension is released from the band by the tensioning device, the T-bolt T-head portion moves in a direction away from the frame 22 and carries with it a collar 52 that is affixed to the bolt so that it moves with the bolt. When the collar 52 is spaced from the frame 22, a bias spring 54 associated with the second end of the push-pull cable 48 expands to move the control arm 50 about pivot pin 51, which moves the push-pull cable to pull the crank arm 46, and, in turn, the first link 43, in such a manner as to pivot the indicator tab 42 about the pivot pin 56 and place an edge 42a of the indicator tab 42 between sections of the cowl 58a and 58b. In the event that a maintenance worker attempts to close the cowl halves 58a and 58b, without applying the proper tension to the V-band having the tensioner of the present invention attached thereto, the indicator tab 42 will prevent the closing of the cowl halves and will provide a reminder to the maintenance personnel to check the tension on the V-band.

FIG. 3 illustrates a force-applicating tool such as a socket wrench 60, in place on the tension-applying nut 32. It can be seen that the wrench 60 cooperates with the cam surface 39 of the arm 36 to force the arm away from the nut 32, thereby permitting rotation of the nut. As the nut is rotated as shown by arrow 62 in FIG. 3, the T-bolt head is drawn toward the frame as indicated by the arrow 64, carrying with it the collar 52. The collar 52 is preset at a particular location on the bolt during manufacture of the tensioning device so that when the T-bolt is drawn sufficiently to provide the predetermined amount of tension, for example, 3000 pounds, the locking collar 52 engages a finger at the first end 50a of the control arm 50, forcing the control arm to pivot clockwise as viewed in FIG. 3 about the pivot pin 51. Pivoting of the control arm 50 moves the push-pull cable 48 in a direction, shown by arrow 65, to pivot the second link 46 of the indicator assembly in such a manner as to rotate the indicator tab 42 counterclockwise as viewed in FIG. 3 to move the edge 42a inside the cowling, permitting closure of the cowl halves 58a and 58b. Preferably, the control arm 50, first and second links 43 and 46, and the bias springs 54 and 63 are designed such that the indicator tab 42 remains in the down position, as viewed in FIG. 3, up to the very time that the predetermined tension is applied to the band by the tensioning device as indicated by the movement of the locking collar 52 and its interaction with the finger 50a. The tab 42 then has a snap action quickly moving it to the up position out of the way of the cowl halves in a rapid manner, not as a gradual rotation. The snap action is preferable so that it will not be possible to close the cowl halves up until the time that the predetermined tension is applied to the V-band to ensure safety and integrity of the engine system.

When the T-bolt T-head portion is engaged in the ears 34a and 34b of the keeper 34, it is preferably locked into position by a stop pin 68 biased by a spring 70 into a position blocking exit of the T-bolt head portion from the ears 34a and 34b. If it is desired to remove the V-band, the pin 68 can be manually withdrawn and the T-head removed from the ears. In order to ensure that upon loosening of the nut 32 the T-bolt head will move away from the frame 22 so as to relieve tension on the V-band, a bias spring 70 is installed surrounding the T-bolt within the frame 22 and acts against the distal end of the nut 32 and a pair of collars 72 and 74 attached to the T-bolt to force the T-bolt head away from the frame.

Figure 4:
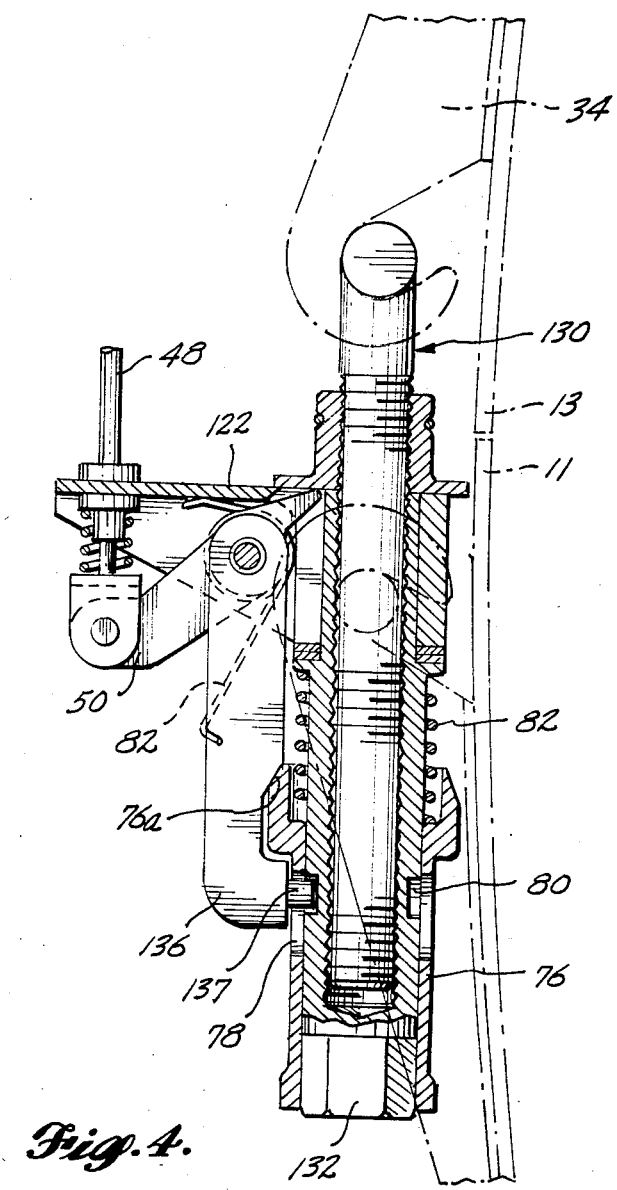
FIG. 4 is a side elevational view in partial section of another embodiment of a band-tensioning device made in accordance with the principles of the present invention.

FIG. 4 illustrates another embodiment of a tensioning device made in accordance with the principles of the present invention. In the embodiment of FIG. 4, a sleeve 76 surrounds a nut 132 threadably engaging a first end of a shank portion of a T-bolt 130. The sleeve 76 has slots 78 formed therein allowing access to a series of holes 80 formed in a barrel portion of the nut 132. An anti-rotation arm 136 is pivotally mounted on a frame 122 and is biased against the sleeve 76 by a bias spring 82. The anti-rotation arm 136 has a pin 137 at a first end thereof that engages the holes 80 in the nut 132 to prevent its rotation. The anti-rotation arm 136 has a cam surface formed therein that cooperates with a cam portion 76a of the sleeve 76 so that when a wrench or other force-applying tool is placed on the nut the wrench will force the sleeve 76 in the direction of the T-bolt head and the cam portion 76a of the sleeve and the cam surface of the anti-rotation arm 136 cooperate to move the anti-rotation arm away from the nut 132 disengaging the pin 137 from the holes in the nut and permitting rotation of the nut to increase or decrease the tension applied by the tensioning device. Upon removal of the wrench from the nut, a bias spring 82 that surrounds the shank of bolt 130 will expand a longitudinal direction and force the sleeve 76 back over the nut, causing the slots 78 to register with the pin 137 on the anti-rotation arm 136 and permit engagement of the pin 137 with the holes 80 in the nut 132, again preventing rotation of the nut 132. The remaining aspects of the tensioning device of FIG. 4 are essentially the same as those described earlier and the tensioning device is again attached by means of control arm 50 and a push-pull cable 48 to a remote indicating device.

It can be seen therefore that a tensioning device for use with a band-type clamp has been provided that is of low profile and that can be adjusted to a predetermined tension within a confined area. A remote indicating device is associated with the tensioning device to provide an indication of whether or not a predetermined amount of tension has been applied to the band clamp by the tensioning device. While two embodiments of the tensioning device of the present invention have been described and illustrated, it will be understood by those of ordinary skill in the art and others that changes can be made to the illustrated and described embodiments while remaining within the spirit and scope of the present invention. For example, the interaction between the anti-rotation means and the force-applicating tool, such as a wrench, used to adjust the tensioning device can be accomplished through means other than either of those illustrated and described as long as the anti-rotation means is disengaged upon placement of a force-applicating tool on the device. Further, while the linkage described and illustrated between the tensioning device and the remote indicator means provides for a quick snap action of the indicator device at the moment that the predetermined tension is reached, certain environments may tolerate or even prefer that the indicator device be moved more slowly as more and more tension is provided. Also, while the present invention has been described and illustrated in an aircraft engine environment, it is useful in any environment in which a band clamp is used and tension must be applied to the band clamp, particularly in situations where remote indication of the achievement of a predetermined degree of tension is desirable. Therefore, the present invention should be defined solely by reference to the appended claims.

The embodiments of the invention in which an exclusive property or privilege is claimed are defined as follows:

1. In an aircraft having at least one jet engine, said engine being surrounded by a cowl, said cowl being divided into a first portion and a second portion movable between open and closed positions to expose or conceal the engine components, said engine having a first portion and a second portion axially adjacent said first portion, said first and second portions being held together by a V-band circumscribing the area of the joint between said first and second portions, a tensioning assembly for applying tension to said V-band, said tensioning assembly comprising:

a T-bolt having a shank portion and a T-head portion affixed to a first end of said shank portion;

means for mounting said T-bolt to a first end of said V-band;

keeper means affixed to a second end of said V-band and constructed and arranged to cooperably receive said T-head portion of said T-bolt;

a nut threadably engaged with said shank portion of said T-bolt and operable to draw said T-head portion of said T-bolt toward said first end of said band; and, indicator means mounted on said engine remotely from said T-bolt mounting means, operably associated with said T-bolt to provide an indication of the attainment of a predetermined tension on said V-band.

2. The tensioning assembly of claim 1 wherein said indicator means includes:

an indicator tab rotatable between a first position in which said tab is at all times out of engagement with said first and second cowl portions and a second position in which said tab is interposed between said first and second cowl portions to prevent the closing of said cowl portions;

a control means associated with said T-bolt; and control linkage means connecting said indicator tab to said control means in such a manner that said control means moves said indicator tab from its first position to its second position upon the achievement of a predetermined tension by said T-bolt.

3. The tensioning assembly of claim 2 wherein said control means includes:

a control arm pivotally mounted on said T-bolt mounting means and movable between a tensioned position and an untensioned position;

a collar affixed to said T-bolt shank portion at a predetermined position so that when said T-bolt applies a predetermined tension to said V-band, said collar engages a first end of said control arm to move said control arm from said untensioned position to said tensioned position, said control arm when in said tensioned position operating said control linkage to move said indicator tab from its second position to its final position.

4. The tensioning assembly of claim 3 further including biasing means associated with said T-bolt mounting means and said control arm to bias said control arm toward its untensioned position.

5. A tensioning assembly for a band having means at each end of the band for connection to respective male and female parts of the tensioning assembly, said tensioning assembly comprising:
   a T-bolt having a shank portion and a T-head portion affixed transversely to a first end of said shank portion;
   means for mounting said T-bolt to a first end of said band;
   a nut threadably engaging a second end of said shank portion and operable to draw said T-bolt T-head portion toward said first end of said band;
   T-bolt receiving means affixed to a second end of said band and constructed and arranged to cooperatively receive said T-head portion of said T-bolt; and
   indicating means remotely located from said T-bolt mounting means and operably associated with said T-bolt to provide an indication of the achievement of a predetermined degree of tension on said band.

6. The tensioning assembly of claim 5 wherein said indicating means includes:
   an indicator tab rotatable between a first position and a second position;
   a control cable connected at a first end thereof to said indication tab;
   indicator linkage means connecting said indicator tab to the first end of said control cable,
   a control arm pivotally mounted on said T-bolt mounting means for swinging movement between a tensioned position and an untensioned position,
   a control linkage means connecting a second end of said control cable to a first end of said control arm;
   a collar affixed to said shank portion of said T-bolt and linearly movable with it, said collar being positioned such that upon the attainment of a predetermined degree of tension on said band, said collar engages a second end of said control arm to move said control arm to said tensioned position, said control arm cooperating with said control cable and said linkage means to move said indicator tab from said first position to said second position when said control arm moves to its tensioned position.

7. The tensioning assembly of claim 6 further including:
   biasing means associated with said control cable and said control arm for biasing said control arm toward its untensioned position.

8. The tensioning assembly of claim 7 further including:
   anti-rotation means associated with said nut and said T-bolt mounting means and operable to engage said nut to prevent rotation of said nut, said anti-rotation means being disengageable from said nut by placement of a force applicating tool on said nut.

9. A tensioning assembly for a band having means at each end of the band for connection to respective male and female parts of the tensioning assembly, said tensioning assembly comprising:
   a T-bolt having a shank portion and a T-head portion affixed transversely to said shank portion at a first end thereof;
   means for mounting said T-bolt to a first end of said band;
   a nut threadably engaging the second end of said shank portion of said T-bolt and operable to draw said T-bolt T-head portion toward said first end of said band;
   a keeper means affixed to a second end of said band and constructed and arranged to cooperably receive said T-head portion of said T-bolt; and
   anti-rotation means associated with said T-bolt mounting means and said nut and operable to engage said nut to prevent rotation of said nut, said anti-rotation means being disengageable from said nut by the placement of a force-applicating tool on said nut, said anti-rotation means including an arm pivotally mounted to said T-bolt mounting means and movable between a first position in which a first portion of said arm engages said nut and a second position in which said first portion is spaced from said nut.

10. The assembly of claim 1 wherein said nut includes a ring portion affixed to said nut and rotatable with said nut, said ring having a series of apertures formed in its outer periphery and wherein further said arm includes a pin extending from said first portion of said arm so as to engage selective ones of said apertures when said arm is in its first position.

11. The assembly of claim 10 further including biasing means associated with said arm for biasing said arm toward its first position.

12. The assembly of claim 11 wherein said first portion of said arm includes a cam surface operatively engageable by said force-applicating tool to move said arm from its first position to its second position.

13. The assembly of claim 11 further including a sleeve surrounding said nut, said sleeve having openings formed therein that selectively register with the apertures in said ring, said pin passing through said openings and engaging said apertures when said arm is in said first position.

14. The assembly of claim 13 wherein said arm has a cam surface formed thereon spaced from said first portion of said arm, said sleeve having a cam portion cooperatively engaging said cam surface of said arm such that movement of said sleeve in a direction toward said T-head portion of said T-bolt lifts said arm to its second position, said sleeve being moved in the direction of said T-bolt upon positioning of a force-applicating tool on said nut.

15. The assembly of claim 14 further including biasing means associated with said sleeve and said T-bolt mounting means to bias said sleeve in a direction away from said T-head portion of said T-bolt.

* * * * *

UNITED STATES PATENT AND TRADEMARK OFFICE
CERTIFICATE OF CORRECTION

PATENT NO. : 4,557,441

DATED : December 10, 1985

INVENTOR(S) : Eric L. Aspinall

It is certified that error appears in the above-identified patent and that said Letters Patent is hereby corrected as shown below:

| | | |
|---|---|---|
| Column 1, | line 54, | Delete "an" before "another" |
| Column 7, | line 9, | "final" should be --first-- |
| Column 8, | line 32, | "1" should be --9-- |

Signed and Sealed this

Fourth Day of March 1986

[SEAL]

Attest:

DONALD J. QUIGG

Attesting Officer

Commissioner of Patents and Trademarks